United States Patent
Fay

(10) Patent No.: US 9,325,017 B2
(45) Date of Patent: Apr. 26, 2016

(54) METHOD FOR CONTROLLING IONOMER AND PLATINUM DISTRIBUTION IN A FUEL CELL ELECTRODE

(75) Inventor: Matthew M. Fay, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1930 days.

(21) Appl. No.: 12/510,460

(22) Filed: Jul. 28, 2009

(65) Prior Publication Data

US 2011/0027696 A1 Feb. 3, 2011

(51) Int. Cl.
*H01M 4/04* (2006.01)
*H01M 4/88* (2006.01)
*H01M 4/86* (2006.01)
*H01M 4/92* (2006.01)
H01M 8/02 (2016.01)
H01M 8/10 (2016.01)

(52) U.S. Cl.
CPC .......... *H01M 4/8814* (2013.01); *H01M 4/8642* (2013.01); *H01M 4/8657* (2013.01); *H01M 4/8807* (2013.01); *H01M 4/8828* (2013.01); *H01M 4/8835* (2013.01); *H01M 4/8892* (2013.01); *H01M 4/92* (2013.01); *H01M 4/921* (2013.01); *H01M 8/0245* (2013.01); *H01M 8/0234* (2013.01); *H01M 8/0267* (2013.01); *H01M 8/1004* (2013.01); *H01M 2008/1095* (2013.01); *Y02E 60/50* (2013.01)

(58) Field of Classification Search
CPC .................................................. H01M 4/8814
See application file for complete search history.

(56) References Cited

U.S. PATENT DOCUMENTS

| | | | |
|---|---|---|---|
| 4,871,703 A | 10/1989 | Beaver et al. | |
| 6,500,217 B1 * | 12/2002 | Starz et al. | 29/623.5 |
| 6,696,382 B1 * | 2/2004 | Zelenay et al. | 502/168 |
| 7,410,930 B2 | 8/2008 | Wakita et al. | |
| 2006/0029757 A1 | 2/2006 | Komada | |

FOREIGN PATENT DOCUMENTS

| | | |
|---|---|---|
| CN | 1425207 A | 6/2003 |
| CN | 1553534 A | 12/2004 |
| CN | 1806356 A | 7/2006 |

OTHER PUBLICATIONS

Chinese Office Action dated Jun. 30, 2015; Application No. 201010243334.3; Applicant:GM Global Technology Operations, Inc..; 7 pages.

* cited by examiner

*Primary Examiner* — Stuart Hendrickson
(74) *Attorney, Agent, or Firm* — BrooksGroup

(57) ABSTRACT

One embodiment of the invention includes a method including applying a first ink comprising carbon over a substrate and drying the first ink to form a first electrode layer, applying a second ink including a second catalyst over the first electrode layer and drying the second ink to form a second electrode layer, and applying a third ink comprising an ionomer solution over the second electrode layer and drying the third ink to form an ionomer overcoat.

22 Claims, 3 Drawing Sheets

METHOD FOR CONTROLLING IONOMER AND PLATINUM DISTRIBUTION IN A FUEL CELL ELECTRODE

TECHNICAL FIELD

The field to which the disclosure generally relates includes electrodes for use in fuel cells.

BACKGROUND

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electro-chemical device that includes an anode and a cathode with an electrolyte between the anode and the cathode. The anode receives hydrogen-rich gas or pure hydrogen and the cathode receives oxygen or air. The hydrogen gas is dissociated in the anode to generate free protons and electrons. The protons pass through the electrolyte to the cathode, where the protons react with the oxygen and the electrons in the cathode to generate water. The electrons from the anode are unable to pass through the electrolyte. Therefore, the electrons are directed through a load to perform work before they are sent to the cathode. The work may be used, for example, to operate a vehicle.

Several fuel cells are typically combined in a fuel cell stack to generate the desired power. The fuel cell stack includes a series of bipolar plates. For the automotive fuel cell stack mentioned above, the stack may include about two hundred or more bipolar plates. The fuel cell stack receives a cathode reactant gas, typically a flow of air forced through the stack by a compressor. Not all of the oxygen is consumed by the stack and some of the air is output as a cathode exhaust gas that may include liquid water as a stack by-product. The fuel cell stack also receives an anode hydrogen reactant gas that flows into the anode side of the stack.

SUMMARY OF EXEMPLARY EMBODIMENTS OF THE INVENTION

One embodiment of the invention includes a method including applying a first ink comprising carbon over a substrate and drying the first ink to form a first electrode layer, applying a second ink including a second catalyst over the first electrode layer and drying the second ink to form a second electrode layer, and applying a third ink comprising an ionomer solution over the second electrode layer and drying the third ink to form an ionomer overcoat.

Other exemplary embodiments of the invention will become apparent from the detailed description of exemplary embodiments provided hereinafter. It should be understood that the detailed description and specific examples, while indicating the exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings.

DETAILED DESCRIPTION OF EXEMPLARY EMBODIMENTS

The following description of the embodiments is merely exemplary in nature and is in no way intended to limit the invention, its application, or uses.

In one embodiment of the invention, a method is provided by which an electrode and a membrane electrode assembly may be produced where the ionomer loading and the platinum catalyst loading may vary across the thickness.

Figure 1:
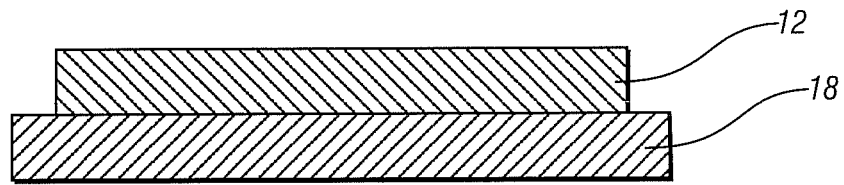
FIG. 1 illustrates a method according to one embodiment of the invention.

In one embodiment of the invention shown in FIG. 1, a first ink is applied to a substrate 18 and the first ink is dried to form on the substrate 18 a first electrode layer 12 having a catalyst. Applying the first ink may include at least one of spraying, dipping, screen printing, rolling, coating, or brushing the first ink. The substrate 18 may comprise at least one of a decal backing, a gas diffusion media layer, a microporous layer, a catalyst coated gas diffusion media layer, or an electrode including a catalyst. For example, the substrate 18 may be a decal backing. The decal backing may be an ePTFE decal material. The first ink may be prepared so that the dried first electrode layer 12 is relatively hydrophobic.

The first ink may include no catalyst, or it may include a carbon support and a relatively low weight percent catalyst powder, for example 0.1 to 40 weight percent catalyst powder. In one embodiment, the catalyst in the first ink may be platinum. For example, the first ink may include 20 weight percent platinum catalyst powder. In another embodiment, the substrate 18 may be an electrode and may consist essentially of carbon (e.g., pure carbon) or may consist essentially of carbon and a binder and being substantially free of a catalyst.

Figure 2:
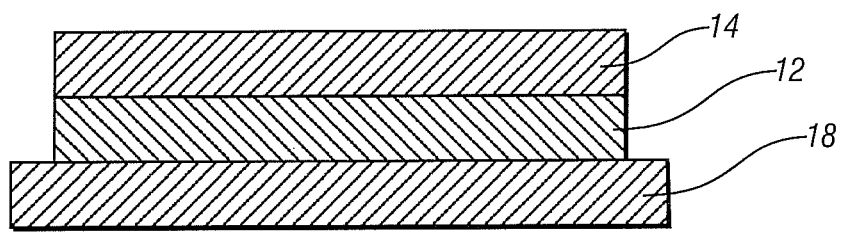
FIG. 2 illustrates a method according to one embodiment of the invention.

As shown in FIG. 2, a second ink is applied over the first electrode layer 12. Applying the second ink may include at least one of spraying, dipping, screen printing, rolling, coating, or brushing the second ink. The second ink is dried to form a second electrode layer 14 having a catalyst. The second ink may be prepared so that the dried second electrode layer 14 is relatively hydrophilic. The second ink may include a relatively high weight percent catalyst powder, for example 40 to 70 weight percent catalyst powder. The percentage of catalyst powder in the second ink may be greater than the percentage of catalyst powder in the first ink. In one embodiment, the catalyst in the second ink may be platinum.

In one embodiment, the first electrode layer 12 and the second electrode layer 14 may include a group of finely divided particles supporting finely divided catalyst particles. The catalyst particles may include metals such as platinum, palladium, and mixtures of metals such as platinum and molybdenum, platinum and cobalt, platinum and ruthenium, platinum and nickel, platinum and tin, other platinum transitional metal alloys, intermetallic compounds, and other fuel cell electrocatalysts known in the art. The catalyst may be supported or unsupported. The support particles are electrically conductive and may include carbon. The support particles may include, but are not limited to, electrically conductive macromolecules of activated carbon, carbon nanotubes, carbon fibers, mesopore carbon, and other electrically conductive particles with suitable surface area to support the catalyst. In one embodiment the first electrode 12 may not include a catalyst.

Figure 3:
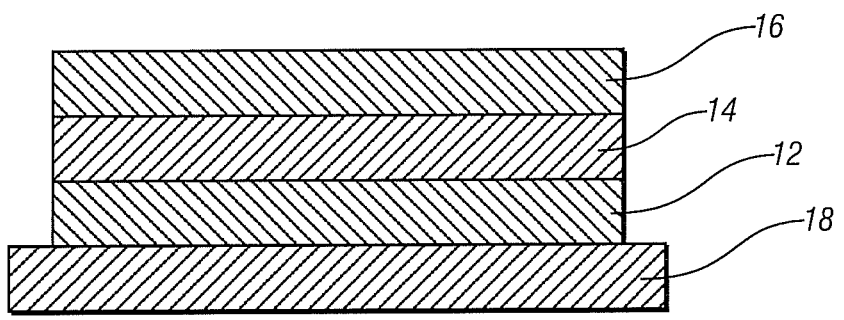
FIG. 3 illustrates a method according to one embodiment of the invention.

Referring now to FIG. 3, a third ink comprising ionomer solution is applied to the second electrode layer 14 after the second electrode layer 14 has been dried. The third ink may include a proton conductive material such as a perfluorinated sulfonic acid polymer. The third ink may include, for example, an ionomer solution. The content of ionomer may vary. In one embodiment, the third ink may include a 5 weight percent ionomer solution. Applying the third ink may include at least one of spraying, dipping, screen printing, rolling, coating, or brushing the third ink. The third ink may be dried to form an ionomer overcoat 16 over the second electrode layer 14. The third ink may be designed to wet and penetrate the second electrode layer 14 but not the first electrode layer 12. The amount of ionomer in the first electrode layer 12 may come only from the preparation of the first ink, not from the ionomer overcoat 16. The ionomer content of the third ink may be chosen such that the desired ionomer content in the second electrode layer 14 is achieved.

Figure 4:
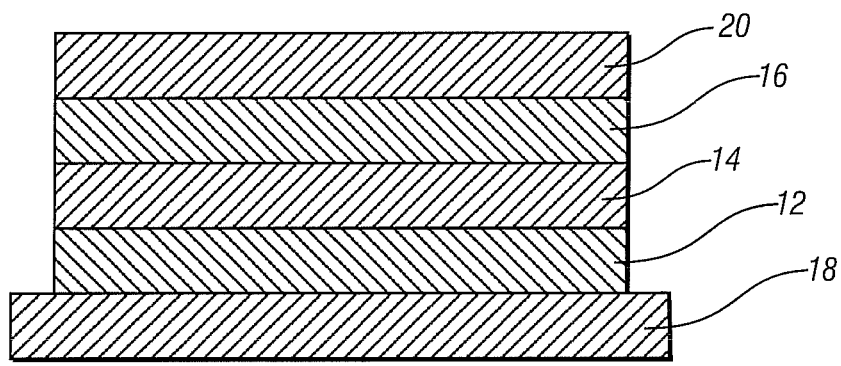
FIG. 4 illustrates a method according to one embodiment of the invention.
Figure 5:
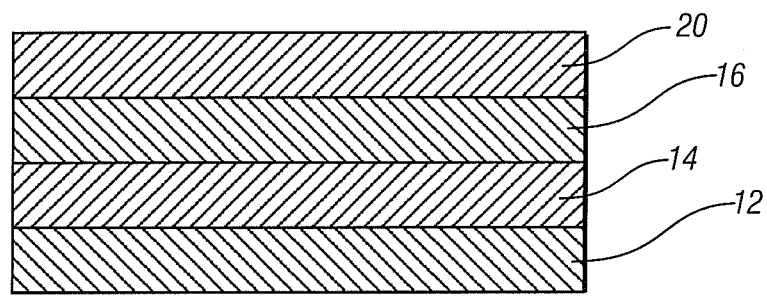
FIG. 5 illustrates a method according to one embodiment of the invention.

According to one embodiment of the invention as shown in FIG. 4, a polyelectrolyte membrane 20 is placed over the ionomer overcoat 16. The substrate 18 may be a decal backing. The substrate 18, the first electrode layer 12, the second electrode layer 14, the ionomer overcoat 16 and the polyelectrolyte membrane 20 may be hot pressed, and the substrate 18 may be pulled off to produce the resultant structure shown in FIG. 5.

Figure 6:
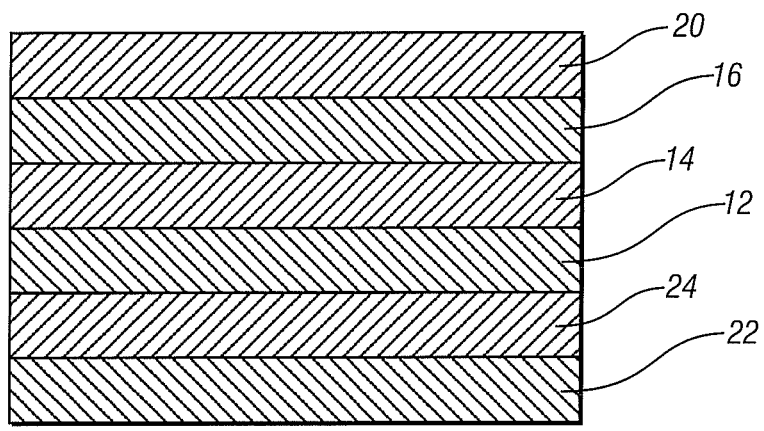
FIG. 6 illustrates a method according to one embodiment of the invention.

According to another embodiment, a microporous layer 24 may be applied to a gas diffusion media layer 22. The first electrode layer 12 may be applied over the microporous layer 24 and the gas diffusion media layer 22 such that the microporous layer 24 faces the first electrode layer 12, as shown in FIG. 6. In one embodiment, the first electrode layer 12 may be applied directly on the microporous layer 24. In another embodiment, the gas diffusion media layer 22 without the microporous layer 24 may be applied over the first electrode layer 12. The first electrode layer 12 may contain a smaller amount of ionomer than the second electrode layer 14. By keeping the amount of ionomer low near the diffusion media 22, mass transport may be improved. The second electrode layer 14 may have a higher amount of catalyst, for example platinum, than the first electrode layer 12. The higher concentration of platinum near the polyelectrolyte membrane 20 may improve catalyst utilization. The actual amount of ionomer present near the gas diffusion media layer 22 and near the polyelectrolyte membrane 20 may be independently controlled. The actual amount of platinum present near the diffusion media 22 and near the polyelectrolyte membrane 20 may be independently controlled.

Consistent with an above-described embodiment, a first ink including 20 weight percent platinum catalyst powder was applied over a decal backing including ePTFE decal material. When a third ink including 5 weight percent ionomer solution (available from Asahi Kasei Corporation) was dropped onto the dried first ink, the ePTFE was not wetted, implying that the ionomer solution did not penetrate through the entire thickness of the electrode layer. However, when the same test was performed with an electrode prepared using 50 weight percent platinum catalyst powder, the ePTFE was very quickly wetted.

Figure 7:
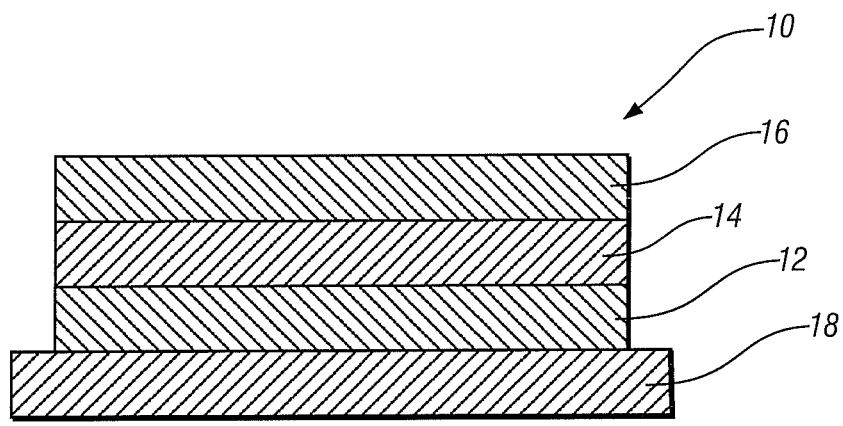
FIG. 7 illustrates a substrate, a first electrode layer, a second electrode layer, and an ionomer overcoat according to one embodiment of the invention.

Referring now to FIG. 7, one embodiment of the invention may include a product 10 comprising a first electrode layer 12 having a catalyst over a substrate 18. The substrate 18 may comprise at least one of a decal backing, a gas diffusion media layer, a microporous layer, a catalyst coated gas diffusion media layer, or an electrode including a catalyst. In one embodiment, the substrate 18 is a decal backing. A second electrode layer 14 having a catalyst may overlie the first electrode layer 12. The first electrode layer 12 being relatively hydrophobic and the second electrode layer 14 being relatively hydrophilic. An ionomer overcoat 16 is provided over the second electrode layer 14. In one embodiment, the catalyst loading and ionomer loading varies over the total thickness of the first electrode layer and the second electrode layer together.

Figure 8:
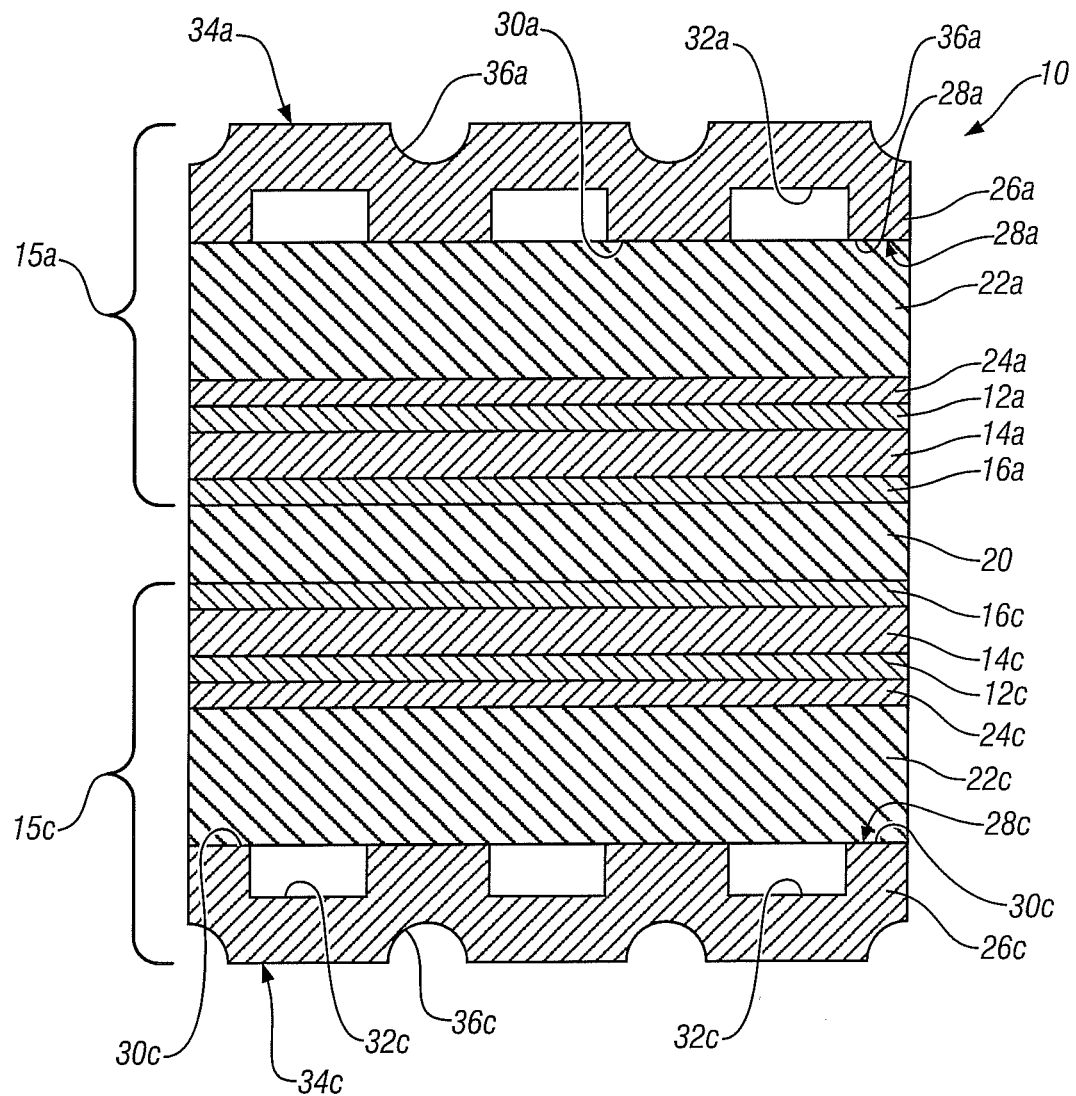
FIG. 8 illustrates a portion of a fuel cell including an anode side and a cathode side according to one embodiment of the invention.

FIG. 8 illustrates a product 10 according to another embodiment of the invention including a portion of a fuel cell stack including a polyelectrolyte membrane 20. On an anode side 15a, an ionomer overcoat 16a is interposed between the polyelectrolyte membrane 20 and a second electrode layer 14a having a catalyst. A first electrode layer 12a having a catalyst overlies the second electrode layer 14a. An optional microporous layer 24a overlies the first electrode layer 12a. A gas diffusion media layer 22a overlies the microporous layer 24a or the first electrode layer 12a. A first bipolar plate 26a overlies the anode gas diffusion media layer 22a. The first bipolar plate 26a includes a first face 28a including a plurality of lands 30a and channels 32a defined therein to provide a reactant gas flow field. The first bipolar plate 26a may include a second face 34a including cooling channels 36a formed therein.

Similarly, on a cathode side 15c, an ionomer overcoat 16c is interposed between the polyelectrolyte membrane 20 and a second electrode layer 14c having a catalyst. A first electrode layer 12c including carbon and which may or may not include a catalyst underlies the second electrode layer 14c. The first electrode layer 12c may consist essentially of carbon (e.g., pure carbon) or may consist essentially of carbon and a binder and be substantially free of a catalyst. An optional microporous layer 24c underlies the first electrode layer 12c. A gas diffusion media layer 22c underlies the microporous layer 24c or the first electrode layer 12c. A second bipolar plate 26c underlies the cathode gas diffusion media layer 22c. The second bipolar plate 26c includes a first face 28c including a plurality of lands 30c and channels 32c defined therein to provide a reactant gas flow field. The second bipolar plate 26c may include a second face 34c including cooling channels 36c formed therein. In one embodiment, on at least one of the anode side 15a or the cathode side 15c, the catalyst loading and ionomer loading varies over the total thickness of the first electrode layer and the second electrode layer together.

The above description of embodiments of the invention is merely exemplary in nature and, thus, variations thereof are not to be regarded as a departure from the spirit and scope of the invention.

What is claimed is:

1. A method comprising:
   applying a first ink comprising carbon over a substrate;
   drying the first ink to form a hydrophobic first electrode layer;
   applying a second ink comprising carbon over the first electrode layer;
   drying the second ink to form a second electrode layer;

applying a third ink comprising an ionomer solution over the second electrode layer; and drying the third ink to form an ionomer overcoat.

2. A method as set forth in claim 1 wherein the first ink further comprises a first catalyst and the second ink further comprises a second catalyst.

3. A method as set forth in claim 1 wherein the second electrode layer comprises a catalyst and the first electrode layer is free of a catalyst.

4. A method as set forth in claim 1 wherein the substrate comprises at least one of a decal backing, a gas diffusion media layer, a microporous layer, a catalyst coated gas diffusion media layer, or an electrode including a catalyst.

5. A method as set forth in claim 1 wherein the substrate comprises a gas diffusion media layer comprising carbon paper or carbon felt.

6. A method as set forth in claim 2 wherein the first catalyst comprises at least one of platinum, palladium, molybdenum, cobalt, ruthenium, nickel, tin, other platinum transitional metal alloys, or intermetallic compounds.

7. A method as set forth in claim 2 wherein the second catalyst comprises at least one of platinum, palladium, molybdenum, cobalt, ruthenium, nickel, tin, other platinum transitional metal alloys, or intermetallic compounds.

8. A method as set forth in claim 2 wherein the first catalyst is present in an amount comprising 0.1 to 40 weight percent of the first ink.

9. A method as set forth in claim 2 wherein the second catalyst is present in an amount comprising 40 to 70 weight percent of the second ink.

10. A method as set forth in claim 1 wherein applying the first ink comprises at least one of spraying, dipping, screen printing, rolling, coating, or brushing the first ink.

11. A method as set forth in claim 1 wherein applying the second ink comprises at least one of spraying, dipping, screen printing, rolling, coating, or brushing the second ink.

12. A method as set forth in claim 1 wherein applying the third ink comprises at least one of spraying, dipping, screen printing, rolling, coating, or brushing the third ink.

13. A method as set forth in claim 2 wherein the substrate comprises the decal backing.

14. A method as set forth in claim 13 further comprising hot pressing the decal backing, the first electrode layer, the second electrode layer, and the ionomer overcoat onto a polyelectrolyte membrane, wherein the ionomer overcoat faces the polyelectrolyte membrane.

15. A method as set forth in claim 1 wherein the substrate comprises a gas diffusion media layer with a microporous layer thereon, the microporous layer comprising carbon particles and a hydrophobic binder, and wherein applying the first ink comprising carbon over the substrate comprises depositing the first ink over the microporous layer.

16. A method comprising:
applying a first ink comprising carbon over a substrate;
drying the first ink to form a first electrode layer;
applying a second ink comprising carbon over the first electrode layer;
drying the second ink to form a second electrode layer;
applying a third ink comprising an ionomer solution over the second electrode layer; and
drying the third ink to form an ionomer overcoat, and wherein the second electrode layer comprises a catalyst and the first electrode layer is free of a catalyst.

17. A method comprising:
applying a first ink comprising carbon and a catalyst over a substrate;
drying the first ink to form a first electrode layer;
applying a second ink comprising carbon and a catalyst over the first electrode layer;
drying the second ink to form a second electrode layer;
applying a third ink comprising an ionomer solution over the second electrode layer; and
drying the third ink to form an ionomer overcoat, and wherein the amount of catalyst in the second ink is greater than the amount of catalyst in the first ink.

18. A method comprising:
applying a first ink comprising carbon over a substrate;
drying the first ink to form a first electrode layer;
applying a second ink comprising carbon over the first electrode layer;
drying the second ink to form a second electrode layer;
applying a third ink comprising an ionomer solution over the second electrode layer so that the ionomer solution penetrates the second electrode layer but not the first electrode layer; and
drying the third ink to form an ionomer overcoat.

19. A method comprising:
applying a first ink consisting essentially of carbon and a binder over a substrate;
drying the first ink to form a first electrode layer;
applying a second ink comprising carbon over the first electrode layer;
drying the second ink to form a second electrode layer;
applying a third ink comprising an ionomer solution over the second electrode layer; and
drying the third ink to form an ionomer overcoat.

20. A method as set forth in claim 1 wherein the second electrode layer is hydrophilic.

21. A method comprising:
applying a first ink comprising carbon over a substrate;
drying the first ink to form a first electrode layer;
applying a second ink comprising carbon over the first electrode layer;
drying the second ink to form a second electrode layer;
applying a third ink comprising an ionomer solution over the second electrode layer; and
drying the third ink to form an overcoat consisting essentially of an ionomer.

22. A method comprising:
applying a first ink comprising carbon over a substrate;
drying the first ink to form a first electrode layer but with the proviso that the first electrode layer is free of a catalyst;
applying a second ink comprising carbon over the first electrode layer;
drying the second ink to form a second electrode layer;
applying a third ink comprising an ionomer solution over the second electrode layer; and
drying the third ink to form an ionomer overcoat.

* * * * *